US008677987B2

(12) United States Patent
Chaganos

(10) Patent No.: US 8,677,987 B2

(45) Date of Patent: Mar. 25, 2014

(54) TILE SAW WITH REMOVABLE TABLE

(75) Inventor: Gregory Chaganos, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/300,070

(22) Filed: Nov. 18, 2011

(65) Prior Publication Data

US 2013/0125405 A1 May 23, 2013

(51) Int. Cl.
*B23D 7/04* (2006.01)
*B23Q 1/64* (2006.01)

(52) U.S. Cl.
USPC ............ 125/35; 269/56; 269/238; 269/289 R; 125/13.01; 83/435.21; 451/411

(58) Field of Classification Search
USPC ..................... 125/13.01, 35; 269/55, 43, 246; 83/435.11–435.27, 707–731; 451/411; 248/346.07, 911, 912
See application file for complete search history.

(56) References Cited

U.S. PATENT DOCUMENTS

| | | | |
|---|---|---|---|
| 4,428,159 A | 1/1984 | Sigetich et al. | |
| 5,615,591 A * | 4/1997 | Scherch et al. | 83/399 |
| 5,676,124 A | 10/1997 | Lee | |
| 5,722,308 A | 3/1998 | Ceroll et al. | |
| 5,746,193 A | 5/1998 | Swan | |
| 6,000,387 A * | 12/1999 | Lee | 125/13.01 |
| 6,080,041 A | 6/2000 | Greenland | |
| 6,119,676 A | 9/2000 | Greenland | |
| 6,152,127 A | 11/2000 | Fuhrman et al. | |
| 6,276,990 B1 | 8/2001 | Greenland | |
| 6,347,624 B1 | 2/2002 | Smith et al. | |
| 6,637,424 B1 | 10/2003 | Fuhrman et al. | |
| 6,752,140 B1 * | 6/2004 | Fuhrman et al. | 125/13.03 |
| 6,845,768 B2 | 1/2005 | O'Banion et al. | |
| 7,308,844 B2 | 12/2007 | Sheddy et al. | |
| 7,387,120 B2 | 6/2008 | O'Banion et al. | |
| 7,406,962 B1 * | 8/2008 | Chen | 125/13.01 |
| 7,455,003 B2 | 11/2008 | Sheddy et al. | |
| 7,721,638 B2 * | 5/2010 | Verhalen et al. | 83/718 |
| 7,823,575 B2 | 11/2010 | O'Banion et al. | |
| 7,926,477 B2 * | 4/2011 | Li | 125/13.01 |

(Continued)

FOREIGN PATENT DOCUMENTS

| | | |
|---|---|---|
| EP | 2113354 A2 | 11/2009 |

OTHER PUBLICATIONS

International Search Report in correspondence PCT application (i.e., PCT/IB2012/002708), mailed Apr. 10, 2013 (10 pages).

*Primary Examiner* — Joseph J Hail
*Assistant Examiner* — Marc Carlson
(74) *Attorney, Agent, or Firm* — Maginot, Moore & Beck

(57) ABSTRACT

A saw system in one embodiment includes a base including a rail system, a table positionable on the rail system and including a work piece support surface defining a support plane, and a roller system attached to the table and configured to engage the rail system when the table is positioned on the rail system, the roller system including a helical actuator assembly configured such that rotational movement of an actuator rod from a first position to a second position causes at least one roller to move along a locking axis between a third position whereat the at least one roller is not engaged with the rail system and a fourth position whereat the at least one roller is engaged with the rail system, wherein the locking axis is substantially parallel to the support plane when the table is positioned on the rail system.

17 Claims, 8 Drawing Sheets

(56) References Cited

U.S. PATENT DOCUMENTS

2008/0087153 A1* 4/2008 Lee ............................ 83/435.11
2010/0288257 A1* 11/2010 Wei et al. ................... 125/13.01
2010/0300258 A1* 12/2010 Werder et al. ................... 83/483
2012/0118278 A1* 5/2012 La Banco et al. ............... 125/35

* cited by examiner

TILE SAW WITH REMOVABLE TABLE

FIELD OF THE INVENTION

This patent relates generally to the field of devices used to cut tiles and other hard materials, including materials which require cooling while being worked.

BACKGROUND

Tile saws are widely used for cutting hard materials such as bricks and tiles. These hard materials require a cooling liquid to be applied as they are being cut since high temperature working of the material may result in cracking. Accordingly, tile saw systems typically include a power head assembly, a table, a base for supporting the table and a water tray located under the base. The system is configured to apply a stream of water to a blade held within the power head assembly. The water flows over the work piece and is collected in the water tray. The water is thus used to cool the blade and the work piece. Additionally, debris formed by cutting the work piece is entrapped in the water.

In some tile saw systems, the table upon which a work piece is supported is movable with respect to the power head assembly. This allows for increased control over the cut since the work piece can be secured to the table at a desired orientation. In such moving table systems, a rail structure may be provided on the base. The rail structure is engaged by rollers attached to the table. By applying force to the table, the rollers roll along the rail system allowing the work piece to be brought into contact with the blade in the power head assembly.

While rail and roller system can be very effective in increasing the accuracy of cuts, the rail and roller system are generally exposed to water spray which carries debris that is generated by the cutting operation. As a result, the rails and rollers become coated with debris which interferes with smooth operation of the rail and roller system. This interference necessitates increased use of force by the operator and erratic movement of the table. Consequently, cuts become more difficult to control and accuracy of the cuts is reduced. Additionally, operation of the rail and roller system coated with interfering debris causes increased wear of the rail and roller system further adding to the imprecision of cuts.

In order to alleviate the effects of debris build-up on rail and roller systems, the systems must be cleaned. Cleaning of the systems is problematic in some systems, however, because of the location of the rail and roller system underneath the table as well as the tight clearances in the rail and roller system.

What is needed is a rail and roller system which can be used to guide movement of a table with a work piece positioned thereon. What is further needed is a system which allows a user to easily and thoroughly remove debris from the rail and roller system.

SUMMARY

In accordance with one embodiment of the disclosure, a saw system includes a base including a rail system, a table positionable on the rail system and including a work piece support surface defining a support plane, and a roller system attached to the table and configured to engage the rail system when the table is positioned on the rail system, the roller system including a helical actuator assembly configured such that rotational movement of an actuator rod from a first position to a second position causes at least one roller to move along a locking axis between a third position whereat the at least one roller is not engaged with the rail system and a fourth position whereat the at least one roller is engaged with the rail system, wherein the locking axis is substantially parallel to the support plane when the table is positioned on the rail system.

In another embodiment, a saw system includes a base including a rail system, a table removably positioned on the rail system and including a work piece support surface defining a support plane, at least one roller attached to the table and configured such that when the table is positioned on the rail system, the at least one roller is movable along an axis parallel to the support plane between a first position spaced apart from the rail system and a second position whereat the at least one roller is engaged with the rail system, and a transfer mechanism configured to force movement of the at least one roller between the first position and the second position in response to rotation of an actuator rod between a third position and a fourth position.

DESCRIPTION

Figure 1:
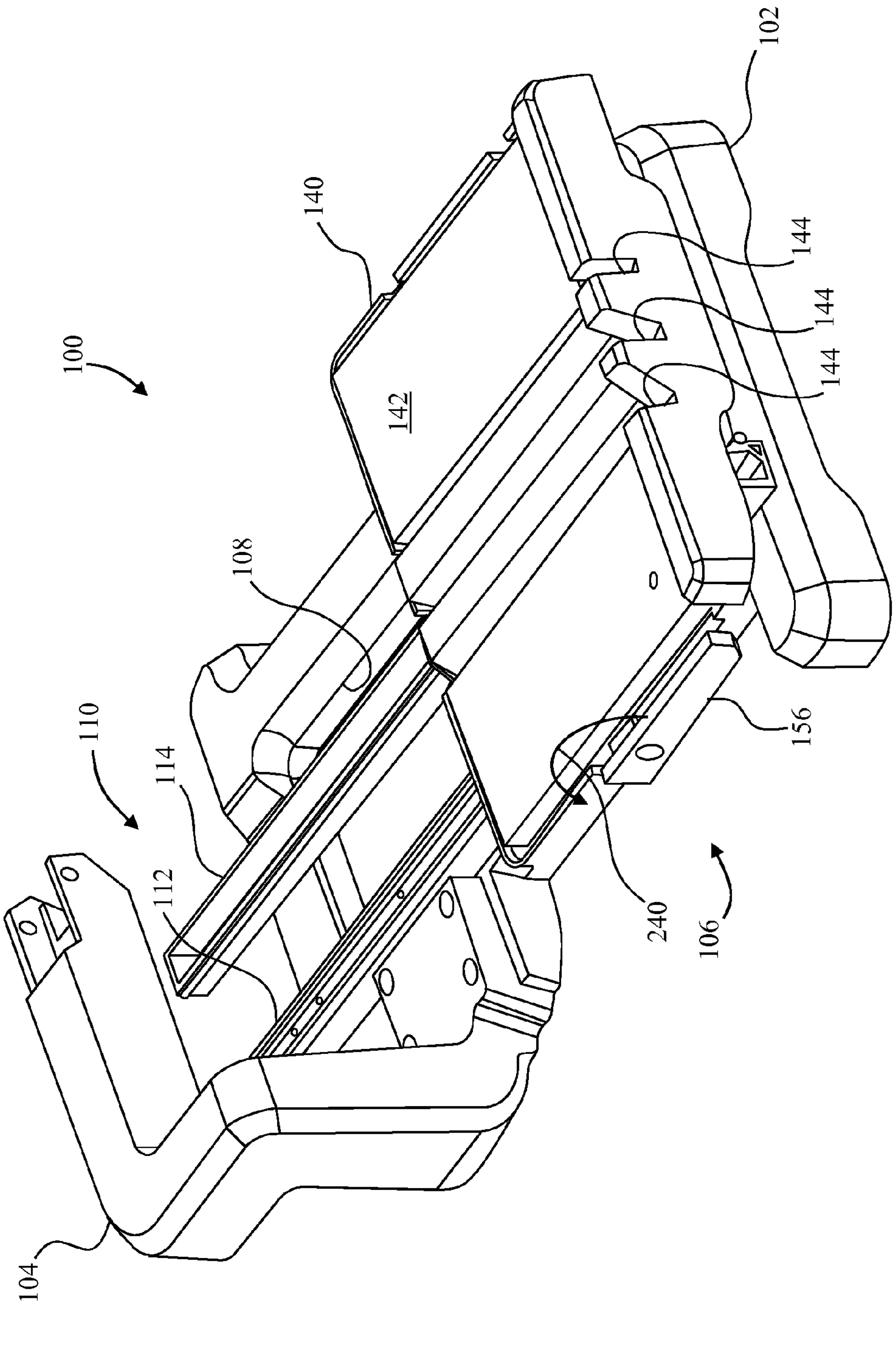
FIG. 1 depicts a perspective view of a tile saw system in accordance with principles of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the invention includes any alterations and modifications to the illustrated embodiments and includes further applications of the principles of the invention as would normally occur to one skilled in the art to which this invention pertains.

FIG. 1 depicts a saw system 100. The saw system 100 includes a base 102, a support structure 104, and a table assembly 106. A power tool (not shown) is supported by the support structure 104 at a location above the base 102. The base 102 includes a tray portion 108 that may be configured to collect water. The tray portion 108 may include one or more connections (not shown) for supplying water to the saw system 100 and for providing drainage of the tray portion 108.

The saw system 100 further includes a rail system 110 which in this embodiment includes two rails 112 and 114 fixedly attached to the base 102 and extending along the entire length of the base 102. The rails 112 and 114 are substantially mirror images of each other and are described more fully with reference to rail 112 which is shown more clearly in FIG. 2.

The rail 112 includes a substantially "U" shaped base 120 with a number of mounting holes 122 extending through a bottom portion 124 of the base 120 at locations above the tray portion 108. A guide rod 126 is fixedly attached to an inner wall 128 of the base 120. A stiffening member 130 extending from the inner wall 128 to the bottom portion 124 provides the inner wall 128 with increased rigidity. The guide rod 126 and stiffening member 130 extend along substantially the entire length of the inner wall 128.

Returning to FIG. 1, the table assembly 106 includes a table 140. The table 140 has a generally planar work piece support surface 142 which defines a support plane. Various trenches 144 provided in the support surface 142 allow work pieces (not shown) to be supported at various angles, typically with the assistance of an angled block (not shown) or the like. The table 140 is attached to the rail system 110 by a pair of stationary rollers 146/148 and a pair of movable rollers 150/152 (see FIG. 2). The rollers 146/148/150/152 are part of a roller system 154 that is shown in further detail in FIG. 3.

The roller system 154 includes a handle 156 connected to an actuator rod 158. The actuator rod 158 includes a shank portion 160 and a shaft portion 162. A helical slot 164 extends from a distal end 166 of the shaft portion 162 toward the shank portion 160. The slot 164 extends from the outer surface 168 of the shaft portion 162 to an inner wall 170 which defines a bore 172. A bore 174, which in this embodiment opens to the slot 164, is located near the distal end 166 and extends from the outer surface 168 to the inner wall 170.

The shaft portion 162 is sized to extend through a hole 176 in a support flange 180. The slot 164 is sized to receive a tab 182 which extends from the support flange 180 into the hole 176. The bore 172 of the actuator rod 158 is sized to receive a proximal end portion 184 of an actuator rod follower 186. The actuator rod follower 186 includes a bore 188 sized to receive a pin 190. A neck 192 connects the proximal end portion 184 to a reduced diameter portion 194.

The reduced diameter portion 194 is sized to fit within a sleeve bearing 196 which in turn is sized to be received within a bore 198 of a roller support plate 200. The neck portion 192 is not sized to fit within the bore 198. The roller support plate 200 includes two roller receptacles 202/204 on a lower surface 206. The roller receptacles 202/204 are configured to rotatably secure the movable rollers 150/152 to the roller support plate 200. The upper surface 208 includes two articulation areas 210/212 at the outer edges of the upper surface 208.

The two articulation areas 210/212 align with two articulation areas 214/216 on a roller support base 218. The roller support base 218 is positioned on a flange 220 which is attached to the table 140 (see FIG. 2). A pair of clamp bearings 222 clamps the roller support plate 200 to the roller support base 218 with the articulation areas 210/212 in contact with the articulation areas 214/216, respectively. The clamp bearings 222 include bearing lips 224 which bear against the lower surface 206 of the roller support plate 200. Stop portions 226 of the clamp bearings 222 limit movement of the roller support plate in a direction toward the support flange 180.

Figure 3:
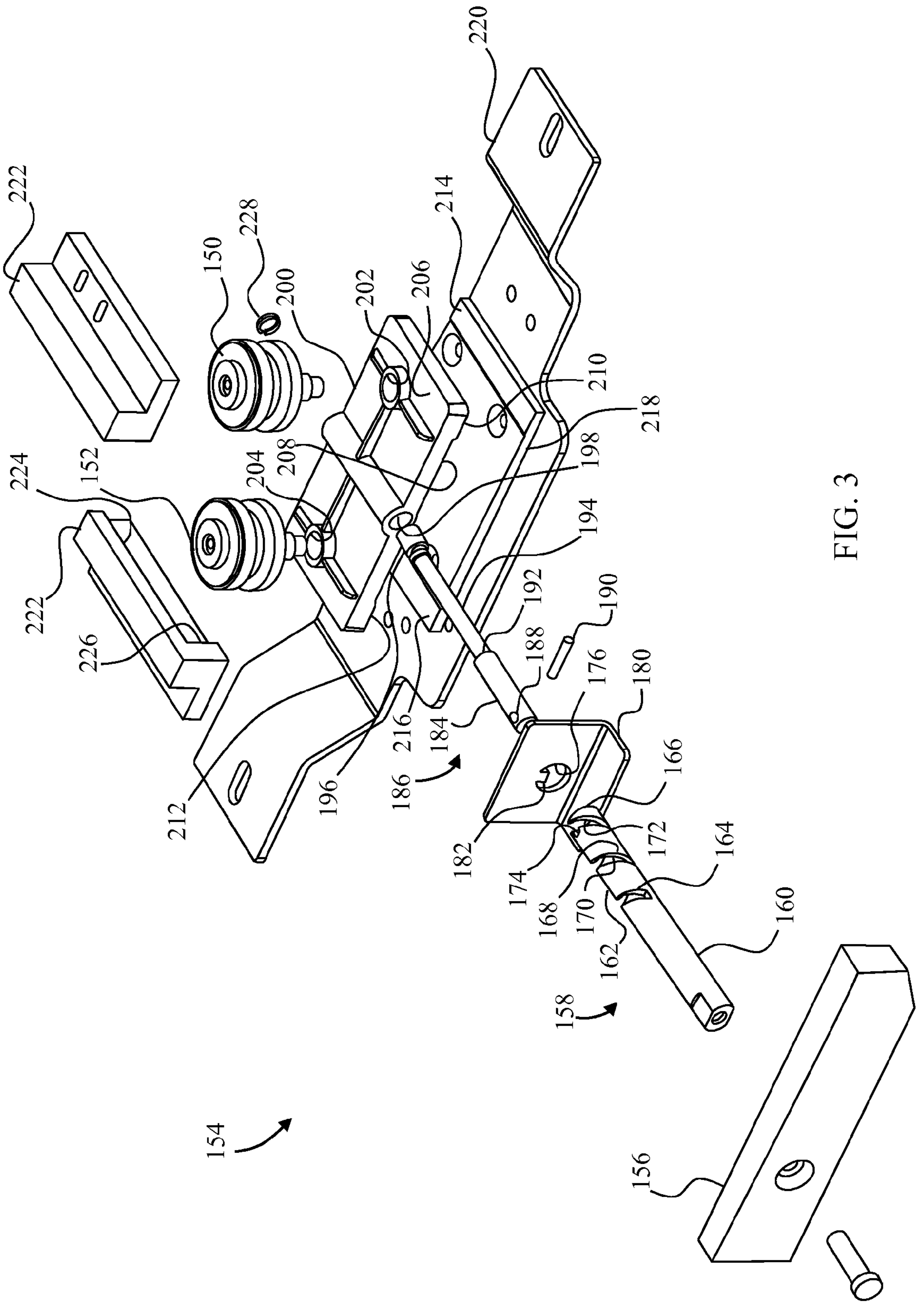
FIG. 3 depicts an inverted exploded perspective view of the roller system of FIG. 2.

The roller system 154 is assembled by inserting the reduced diameter portion 194 of the actuator rod follower 186 within the sleeve bearing 196 (see FIG. 3). The reduced diameter portion 194 and the sleeve bearing 196 are then inserted into the bore 198 in the roller support plate 200. The reduced diameter portion 194 is sized such that as the neck 192 comes into abutment with the roller support plate 200, a portion of the reduced diameter portion 194 extends outwardly of the bore and a snap ring 228 can be used to preclude movement of the neck 192 away from the roller support plate 200.

Next, the roller support plate 200 and the actuator rod follower 186 are positioned on the roller support base 218 which is attached to the flange 220 which is, in turn, attached to the table 140. In this configuration, the articulation areas 210 and 212 are positioned on the articulation areas 214 and 216, respectively. The support plate 200 is then clamped onto the roller support base 218 using the clamp bearings 222 which maintain the articulation areas 210 and 212 in contact with the articulation areas 214 and 216 while allowing for movement between the articulation areas 210/212 and the articulation areas 214/216.

Once the support plate 200 is clamped onto the roller support base 218, the proximal end 184 of the actuator rod follower 186 is aligned with the opening 176 in the support flange 180. The helical slot 164 of the actuator rod 158 is then aligned with the tab 182 and the shaft portion 162 is inserted through the opening 176 in the support flange 180. In some embodiments, the slot 164 may be a straight slot at the distal end of the shaft portion 162.

As the shaft portion 162 is extended through the opening in the support flange 180, the bore 172 will be aligned with the proximal end portion 184 of the actuator rod follower 186. The proximal end portion 184 is then received into the bore 172 and the axial and radial position of the actuator rod follower 186 is adjusted so that the bore 174 in the actuator rod 158 is aligned with the bore 188 in the actuator rod follower 186. The pin 190 is then inserted through the bore 174 into the bore 188 to axially and rotationally secure the actuator rod 158 and the actuator rod follower 186.

Assembly of the roller system 154 is completed by attaching the handle 156 to the shank portion 160 of the actuator rod 158 and by inserting the rollers 150 and 152 into the roller receptacles 204/206. The resulting configuration is depicted in FIG. 4.

Figure 4:
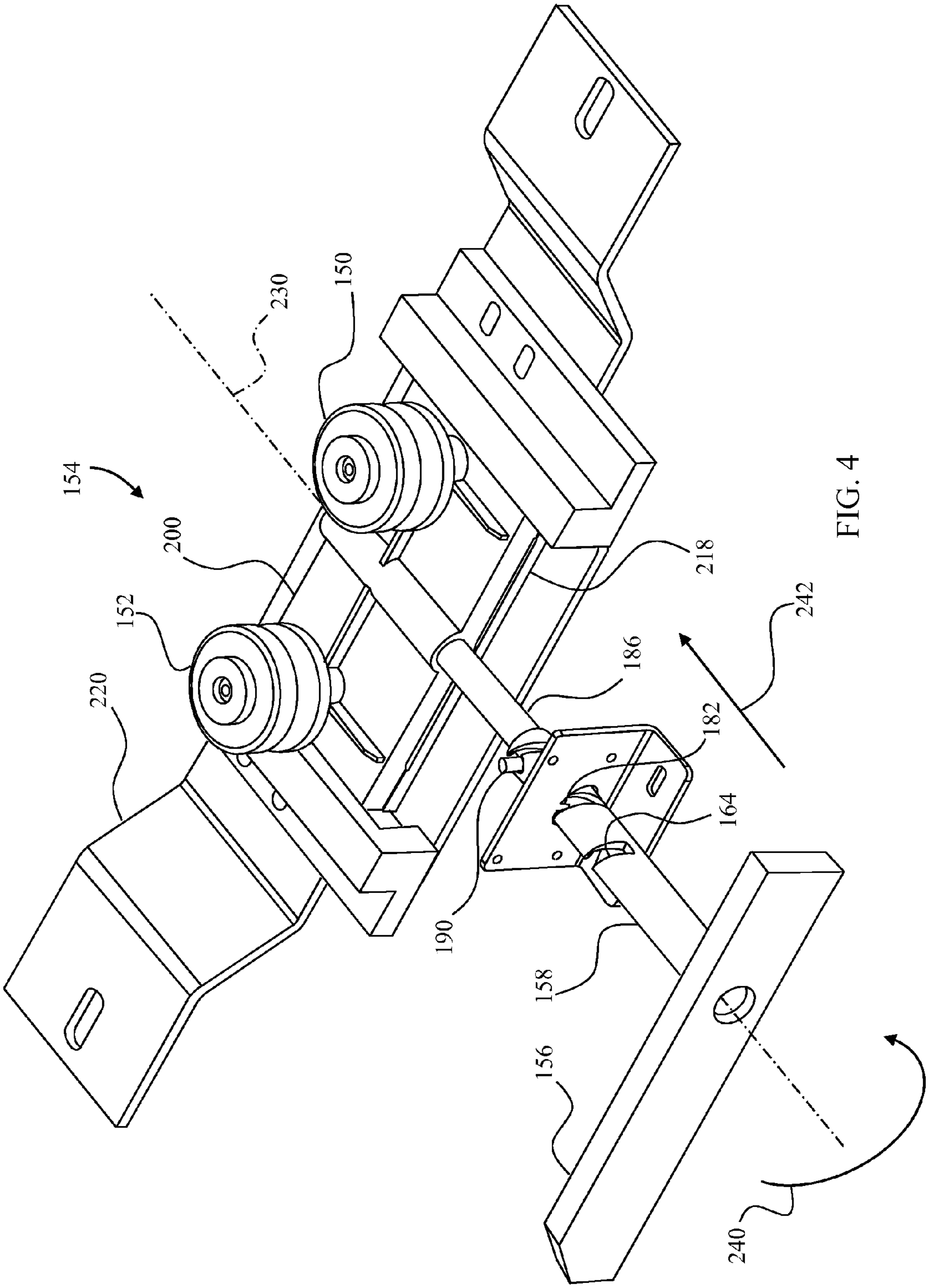
FIG. 4 depicts an inverted perspective view of the roller system of FIG. 2.

When the roller assembly 154 is assembled, as shown in FIG. 4, the rollers 150 and 152 are rotatably held within the roller support plate 200. The actuator rod follower 186 is also rotatable with respect to the roller support plate 200, but axially fixed within the bore 198 by the neck 192 and the snap ring 228 (see FIG. 3). The actuator rod follower 186 is also axially fixed with respect to the actuator rod 158 by the pin 190 while the tab 182 is positioned within the slot 164 of the actuator rod 158.

Figure 2:
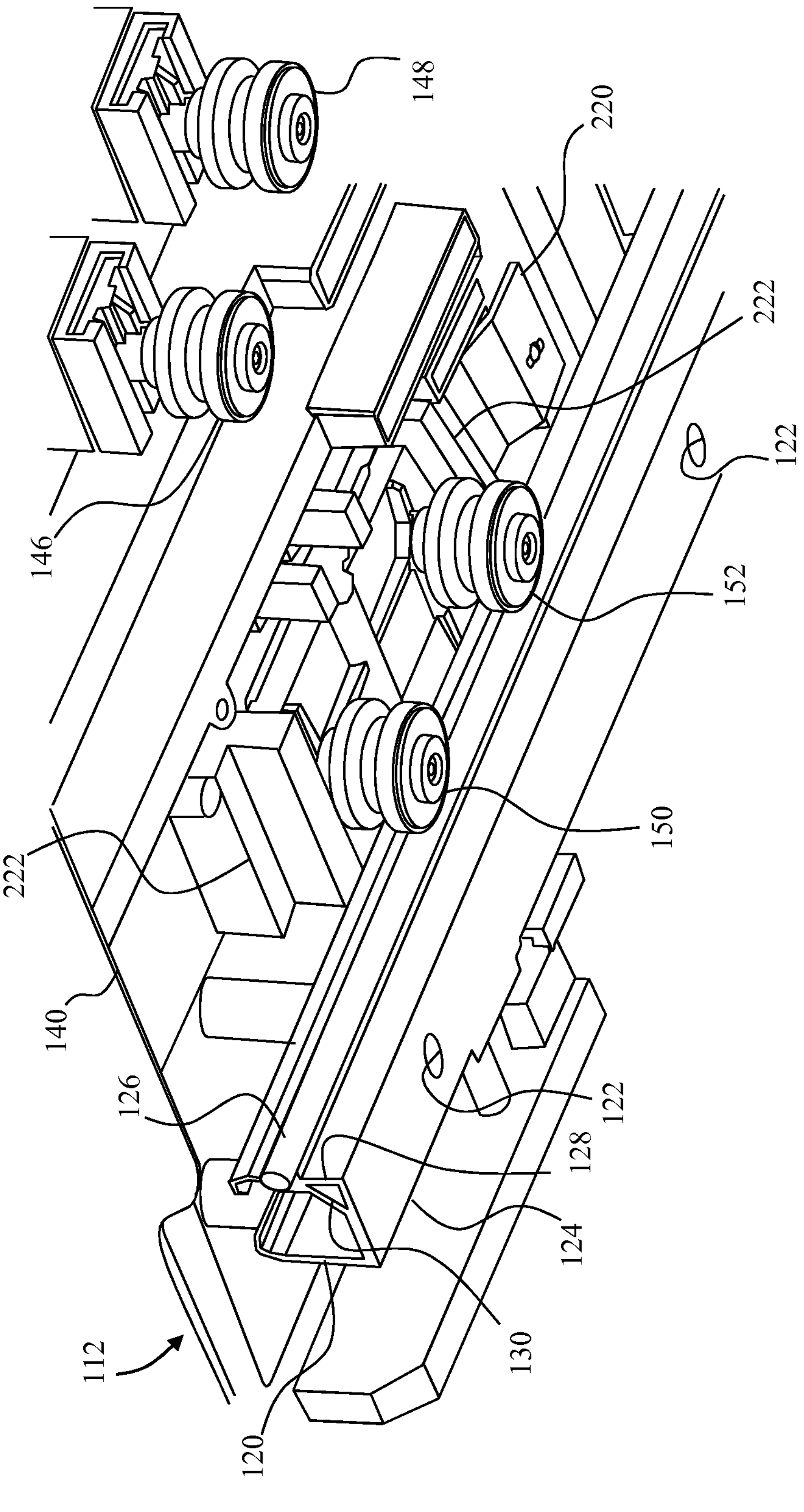
FIG. 2 depicts a partial perspective bottom view of the system of FIG. 1 showing a roller system that can be used to releasably connect a table to a rail system.

The roller system 154 allows the table 140 to be easily removed and reattached to the rail system 110. By way of example, the table may initially be in the configuration depicted in FIG. 2. In FIG. 2, the movable rollers 150 and 152 are engaged with the guide rod 126 on the rail 112 while the stationary rollers 146/148 are engaged with a similar guide rod (not clearly shown) on the rail 114. This allows the table 140 to be moved by a user along the rails 112/114 to cut a work piece (not shown) positioned on the work piece support surface 142 since the rollers 146/148/150 and 152 are rotatably engaged with the guide rods of the rails 112/114.

When it is desired to remove the table 140, a user rotates the handle 156 from the position shown in FIG. 1 in a counter-clockwise direction as indicated by the arrow 240 in FIG. 1. As can be seen in FIGS. 3 and 4, the tab 182 is engaged with the slot 164. Accordingly, as the handle 156 is rotated in the direction of the arrow 240 (note that the orientation of the roller system as depicted in FIGS. 3 and 4 is inverted with respect to the orientation in FIG. 1), the wall of the slot 164 contacts the tab 182 and the actuator rod 158 is forced to move in the direction of the arrow 242 (see FIG. 4) along the locking axis 230. The slot 164 and the tab 182 thus form a transfer mechanism which transfers rotational force into axial movement.

Axial movement of the actuator rod 158 along the locking axis 230, which is substantially parallel to the support plane defined by the work piece support surface 142 (not shown in FIG. 4), causes axial movement of the actuator rod follower 186 along the locking axis 230. Because the roller support plate 200 is axially fixed with respect to the actuator rod follower 186 while being in articulating contact with the articulation areas 214/216, axial movement of the actuator rod follower 186 along the locking axis 230 causes the roller support plate 200 to move axially along the locking axis 230.

Linear movement of the actuator rod 158 thus results in movement of the roller support plate 200 along the locking axis 230. Accordingly, the movable rollers 150/152 are forced to move linearly along the locking axis 230 away from the guide rod 126. The slot 164 is configured such that as the handle 156 is rotated 180 degrees from the position depicted in FIG. 1, the movable rollers 150/152 move from a fully engaged location to a location spaced apart from the guide rod 126 whereat the side of the table 140 adjacent to the handle 156 can be rotated upwardly without the movable rollers 150/152 contacting the guide rod 126. Once the movable rollers 150/152 are clear of the guide rod 126, the table 140 may be pulled away from the rail 114, thereby disengaging the stationary rollers 146/148 and removing the table 140 from the rail system 110.

When the table 140 is to be replaced, the above described sequence is substantially reversed, resulting in the engagement of the rollers 146/148/150/152 with the guide rods of the associated rails 112/114.

Figure 5:
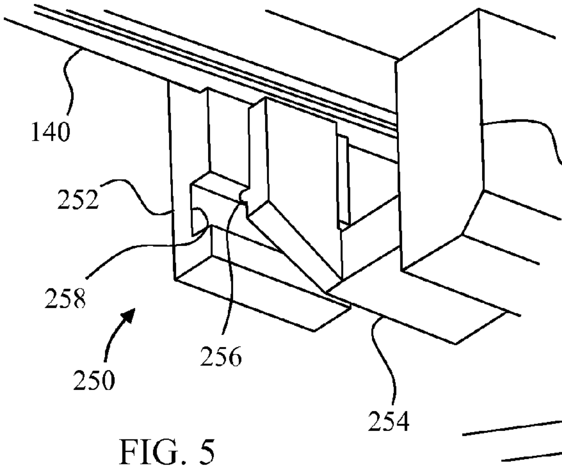
FIG. 5 depicts a partial perspective bottom view of a locking mechanism that inhibits inadvertent release of the roller system of FIG. 2 using a strike plate and a resilient latch.
Figure 6:
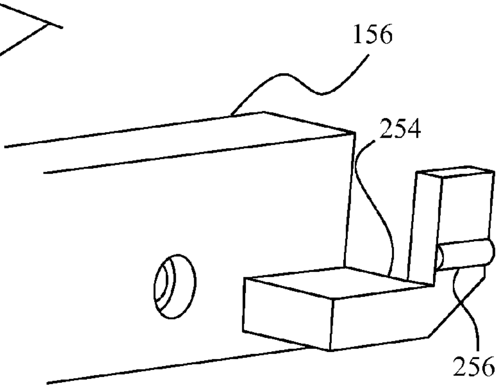
FIG. 6 depicts a partial perspective view of the latch of the locking mechanism of FIG. 5.

In order to prevent inadvertent disengagement of the movable rollers 150/152 from the guide rod 126, one or more locking mechanisms are incorporated into the saw system 100. By way of example, FIGS. 5 and 6 depict a locking mechanism 250 that includes a strike plate 252 attached to the table 140 and a resilient flange 254 extending from the handle 156. The resilient flange 254 includes a protuberance 256 which is sized to fit within a notch 258 in the strike plate 252. When the protuberance 256 is located within the notch 258, rotation of the handle 156 is impeded. Only when a force sufficient to resiliently deform the flange 254 is applied to the resilient flange 254 can the handle 156 be rotated so as to disengage the movable rollers 150/152 as described above. By applying about the same force in the opposite direction, the flange 254 can be resiliently deformed to allow the protuberance 256 to be rotated into a position adjacent the notch 258, thereby re-latching the handle 156.

Figure 7:
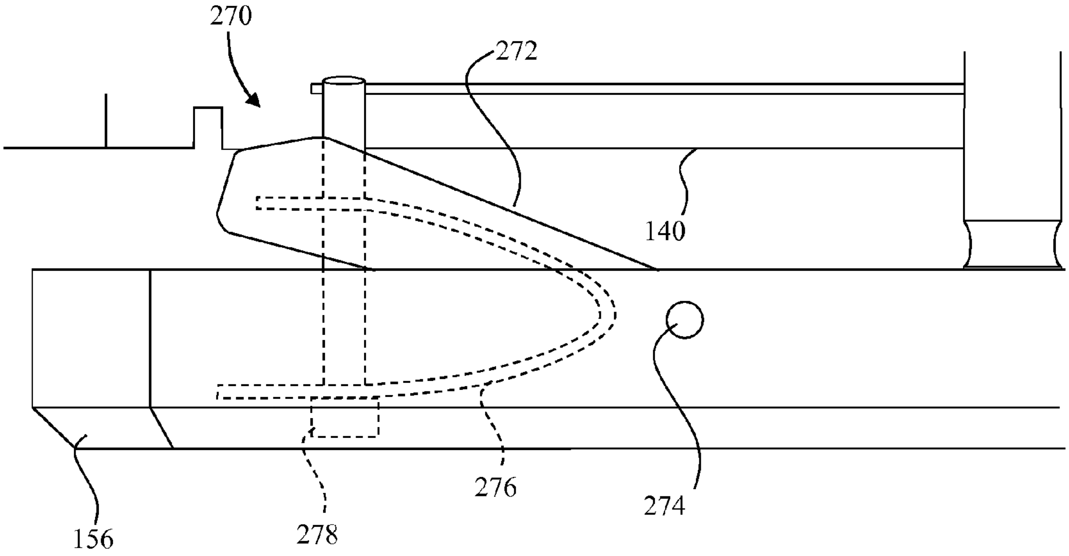
FIG. 7 depicts a partial top plan view of a locking mechanism that inhibits inadvertent release of the roller system of FIG. 2 using a leaf spring attached to a pin, wherein a latch pivotably connected to a handle selectively compresses the leaf spring to allow rotation of the handle.

FIG. 7 depicts a locking mechanism 270 which is incorporated into some embodiments of the saw system 100. The locking mechanism 270 includes a lever arm 272 that is pivotably attached to the handle 156 by a pivot 274. The lever arm 272 is fixedly attached to a leaf spring 276 which is in turn fixedly attached to a pin 278. The leaf spring 276 biases the pin 278 to a location underneath the table 140, thereby inhibiting rotation of the handle 156. The handle may be rotated by pivoting the lever arm 272 about the pivot 274 thereby compressing the leaf spring 276 toward the handle 156. As the leaf spring 276 is compressed, the pin 278 is moved away from the table 140. Once the pin 278 is clear of the table 140, the handle 156 may be rotated. To lock the handle 156, the above described process is reversed.

Figure 8:
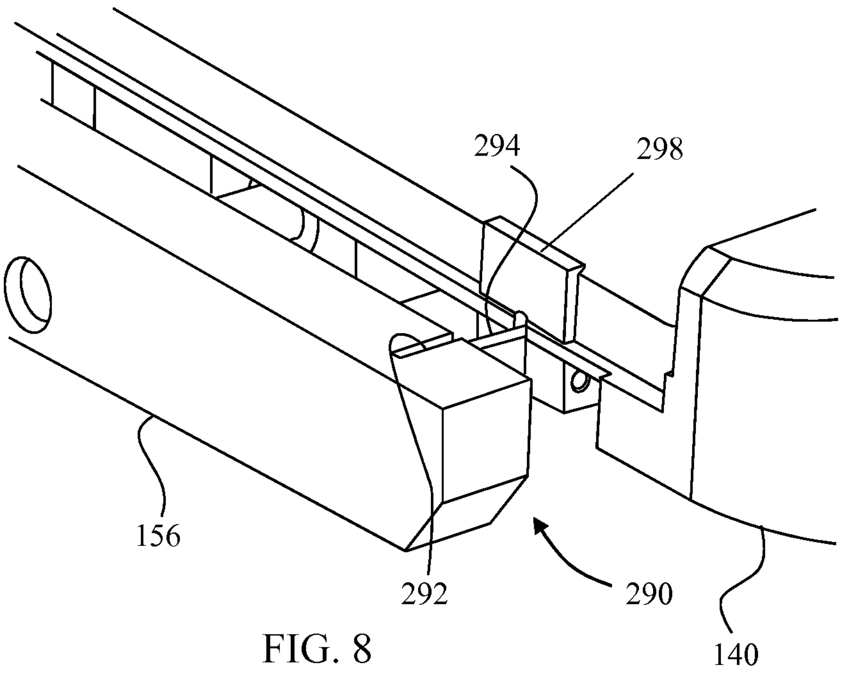
FIG. 8 depicts a partial perspective top view of a locking mechanism that inhibits inadvertent release of the roller system of FIG. 2 using a bar inserted into a slot in the handle.
Figure 9:
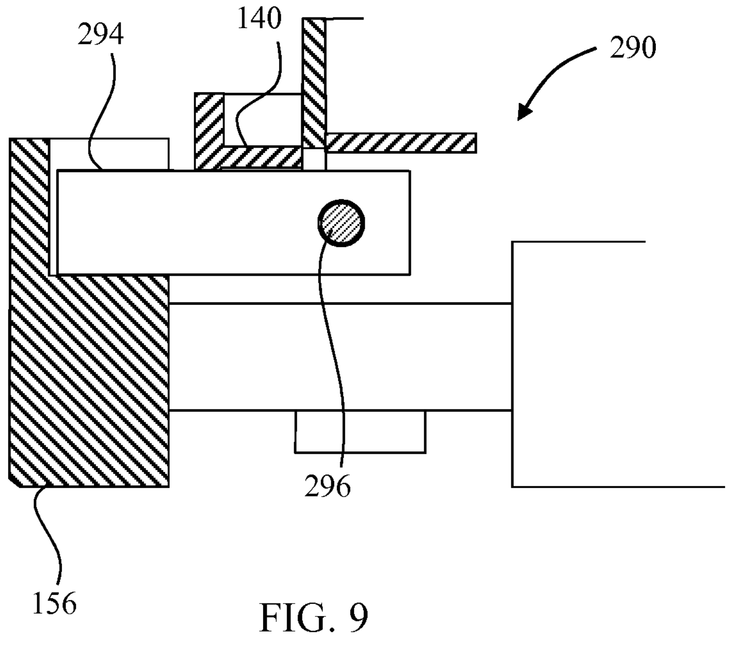
FIG. 9 depicts a partial front cross sectional view of the locking mechanism of FIG. 8.

FIGS. 8 and 9 depict a locking mechanism 290 that includes a slot 292 in the handle 156 and a bar 294 mounted to the table 140 by a pivot 296. A plate 298 is movably located on the edge of the table. If the handle 156 begins to rotate while the bar 294 is in the position depicted in FIG. 9, the side of the slot 292 will contact the bar 294 and bind. Accordingly, inadvertent movement of the handle 156 is inhibited. When the handle 156 is to be rotated, a user simply moves the plate 298, the absence of which is illustrated in FIG. 9, and pivots the bar 294 about the pivot 296 in a clockwise direction (with reference to FIG. 9) and then the handle 156 may be rotated to disengage the rollers 150/152.

Figure 10:
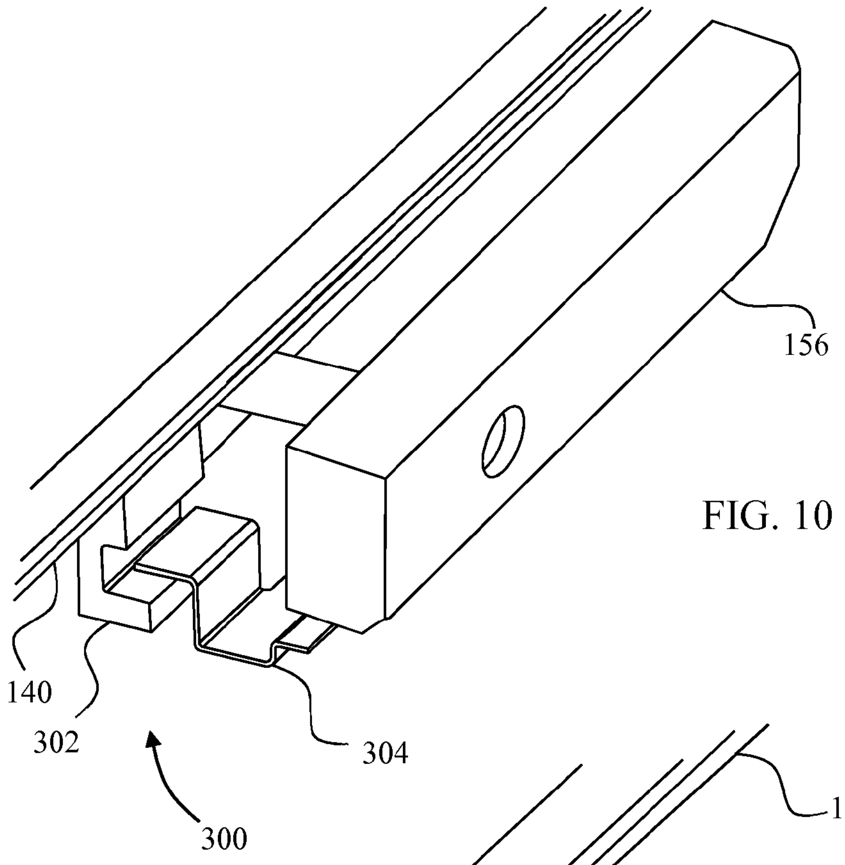
FIG. 10 depicts a partial top perspective view of a locking mechanism that inhibits inadvertent release of the roller system of FIG. 2 using a pivoting latch and a ledge on a strike plate.
Figure 11:
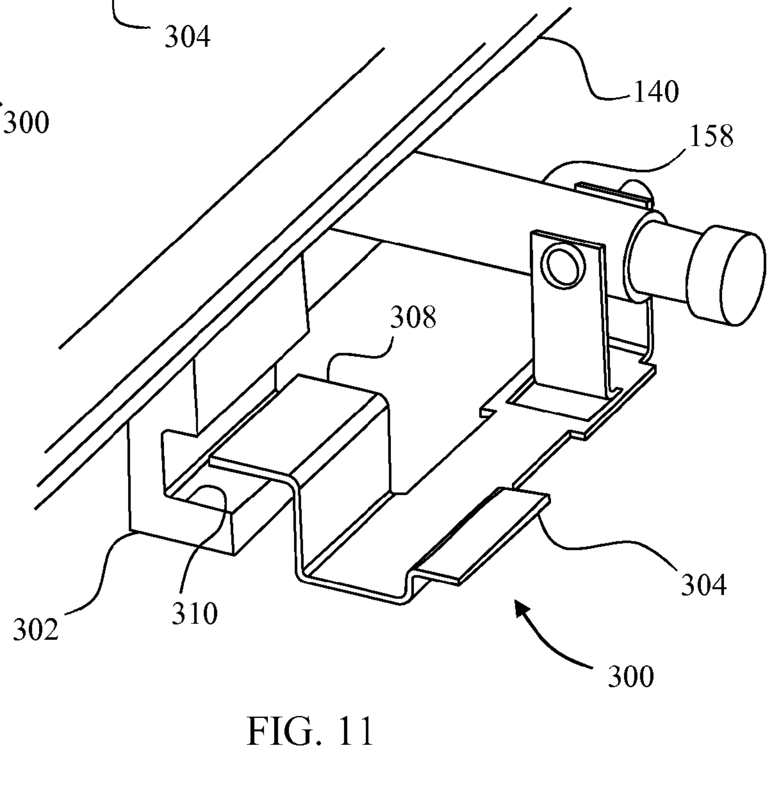
FIG. 11 depicts a partial top perspective view of the locking mechanism of FIG. 10 with the handle removed.

FIGS. 10 and 11 depict a locking mechanism 300 that includes a strike plate 302 fixedly attached to the table 140 and a latch 304 that is pivotably attached to the actuator rod 158. The latch 304 includes a lip 308 that rests upon a ledge 310 of the strike plate 302. In the configuration of FIG. 10, rotation of the handle 156 simply forces the lip 308 against the ledge 310, thereby restricting rotation of the handle 156. By pivoting the latch 304 away from the latch 302, the lip 308 is moved to a location outwardly of the ledge 310. The handle 156, actuator rod 158, and latch 304 may then be rotated to disengage the rollers 150/152.

Figure 13:
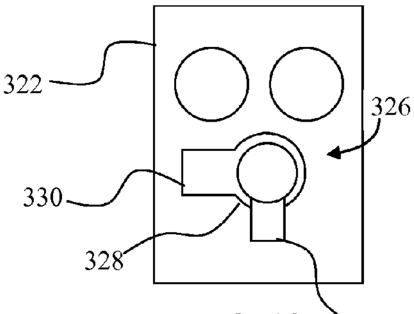
FIG. 13 depicts a partial plan view of the strike plate of FIG. 12 with the latch rotated such that the lock block is not aligned with the keyed bore of the strike plate.
Figure 12:
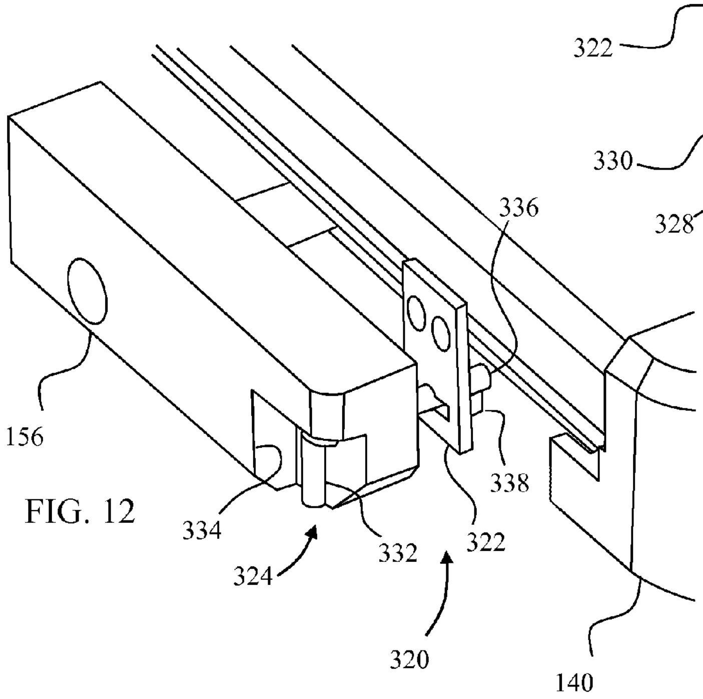
FIG. 12 depicts a partial top perspective view of a locking mechanism that inhibits inadvertent release of the roller system of FIG. 2 using a rotating latch that extends through a handle and a keyed bore in a strike plate.
Figure 14:
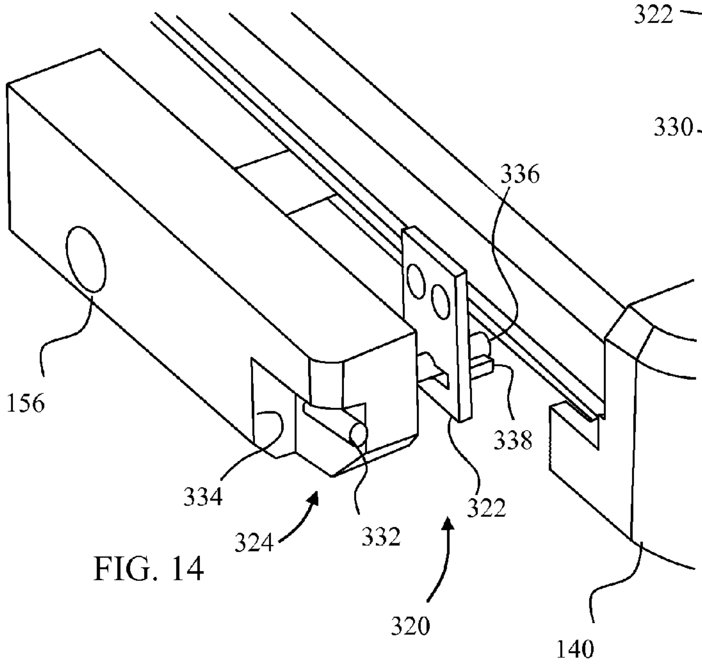
FIG. 14 depicts a partial top perspective view of the locking mechanism of FIG. 12 with the latch rotated to align the lock block with the keyed bore in the strike plate.

FIGS. 12-14 depict a locking mechanism 320 that includes a strike plate 322 and a latch 324. The strike plate 322 is fixedly supported by the table 140 and includes a keyed bore 326 with a circular portion 328 and a rectangular extension 330 extending sideways from the circular portion 328 (see FIG. 13). The latch 324 includes a handle portion 332 which is positioned within a cut-out 334 of the handle 156 and a shank 336 that in the configuration of FIGS. 12 and 13 extends through the handle 156 and the circular portion 328 of the strike plate 322. A lock block 338 extends from the distal end of the shank 336.

Figure 15:
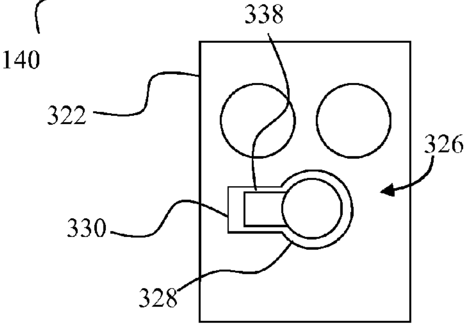
FIG. 15 depicts a partial plan view of the strike plate of FIG. 12 with the latch rotated such that the lock block is aligned with the keyed bore of the strike plate.

In the configuration of FIGS. 12 and 13, the lock block 338 is not aligned with the rectangular extension 330 of the keyed bore 326. Accordingly, the shank 336 cannot be removed from the strike plate 322. Consequently, the shank 336 precludes rotation of the handle 156. By rotating the handle portion 332 to the orientation of FIG. 14, the lock block 338 is rotated into alignment with the rectangular extension 330 as depicted in FIG. 15. Accordingly, the latch 324 can be pulled away from the table 140 such that the shank 336 no longer extends through the strike plate 322. The handle 156 can then be rotated without interference between the latch 324 and the strike plate 322.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A saw system comprising:

a base including a rail system;

a table positionable on the rail system and including a work piece support surface defining a substantially horizontal support plane; and a roller system attached to the table and configured to engage the rail system when the table is positioned on the rail system, the roller system including a helical actuator assembly configured such that rotational movement of an actuator rod about a rod rotational axis defines a longitudinal locking axis, the rotational movement between (i) a first position, in which the table is removable from the rail system, and (ii) a second position, in which the table is captively mounted to the rail system, wherein movement of the actuator rod from the first position to the second position causes at least one roller to move along a path in a direction parallel to and along the longitudinal locking axis between a third position whereat the at least one roller is not engaged with the rail system and a fourth position whereat the at least one roller is engaged with the rail system, wherein the path between the third position and the fourth position is substantially linear and wherein the locking axis is substantially parallel to the substantially horizontal support plane when the table is positioned on the rail system.

2. The saw system of claim 1, further comprising:

a handle fixedly attached to the actuator rod such that rotation of the handle from a fifth position to a sixth position causes the actuator rod to rotate from the first position to the second position.

3. The saw system of claim 2, further comprising:

a locking mechanism including a part configured to selectively inhibit movement of the handle away from the sixth position, wherein the part of the locking mechanism is fixedly positioned on the table; and a handle laterally located adjacent to a side of the table and configured to engage the part of the locking mechanism configured to selectively inhibit movement of the handle.

4. The saw system of claim 3, wherein:

the locking mechanism includes a resilient flange extending from the handle, and the part configured to selectively inhibit movement of the handle includes a strike plate portion fixedly positioned on the table.

5. The saw system of claim 1, the roller system further comprising:

a roller support base; and a roller support plate slidingly positioned on the roller support base, the at least one roller including a roller rotational axis about which rotation of the at least one roller occurs wherein the at least one roller is rotationally attached to the roller support plate and the roller rotational axis is substantially perpendicular to the longitudinal locking axis.

6. The saw system of claim 5, wherein;

the actuator rod includes a helical slot;

the actuator rod is operably connected to the roller support plate; and the table comprises a tab stationarily and fixedly positioned with respect to the table and engaged with the helical slot.

7. The saw system of claim 6, further comprising:

an actuator rod follower, the actuator rod follower configured to transfer axial force from the actuator rod to the roller support plate.

8. A saw system comprising:

a base including a rail system;

a table positionable on the rail system and including a work piece support surface defining a support plane; and a roller system attached to the table and configured to engage the rail system when the table is positioned on the rail system, the roller system including a helical actuator assembly configured such that rotational movement of an actuator rod from a first position to a second position causes at least one roller to move in a direction parallel to and along a locking axis between a third position whereat the at least one roller is not engaged with the rail system and a fourth position whereat the at least one roller is engaged with the rail system, wherein the locking axis is substantially parallel to the support plane when the table is positioned on the rail system a roller support base;

a roller support plate slidingly positioned on the roller support base, the at least one roller including a rotational axis about which rotation of the at least one roller occurs wherein the at least one roller is rotationally attached to the roller support plate and the rotational axis is substantially perpendicular to the locking axis the actuator rod includes a helical slot;

the actuator rod is operably connected to the roller support plate;

the table comprises a tab stationarily and fixedly positioned with respect to the table and engaged with the helical slot an actuator rod follower, the actuator rod follower configured to transfer axial force from the actuator rod to the roller support plate the actuator rod includes a bore extending axially from an end portion of the actuator rod; and a portion of the actuator rod follower is positioned within the bore.

9. A saw system comprising:

a base including a rail system;

a table removably positioned on the rail system and including a work piece support surface defining a substantially horizontal support plane;

at least one roller attached to the table and configured such that when the table is positioned on the rail system, the at least one roller is movable in a linear direction along a path parallel to and along an axis parallel to the substantially horizontal support plane between a first position spaced apart from the rail system and a second position whereat the at least one roller is engaged with the rail system, wherein the path between the first position and the second position is substantially linear; and a transfer mechanism configured to force movement of the at least one roller between the first position and the second position in response to rotation of an actuator rod between a third position in which the table is removable from the rail system and a fourth position in which the table is captively mounted to the rail system.

10. The saw system of claim 9, wherein:

the actuator rod includes a helical slot; and the transfer mechanism comprises a tab stationarily and fixedly positioned with respect to the table and engaged with the helical slot.

11. The saw system of claim 10, further comprising:

a roller support base attached to the table; and a roller support plate slidingly positioned on the roller support base, the at least one roller including a rotational axis about which rotation of the at least one roller occurs wherein the at least one roller is rotationally attached to the roller support plate and the rotational axis is perpendicular to the path.

12. The saw system of claim 11, further comprising:

a clamp assembly configured to maintain the roller support plate on the roller support base.

13. The saw system of claim 11, further comprising:

an actuator rod follower, the actuator rod follower including a first portion operatively engaged with the actuator rod and a second portion operatively engaged with the roller support plate.

14. The saw system of claim 10 wherein:

the actuator rod includes an inner wall defining a bore extending axially from an end portion of the actuator rod;

the helical slot extends from an outer surface of the actuator rod to the inner wall.

15. The saw system of claim 14, wherein the helical slot extends helically from the end portion of the actuator rod.

16. A saw system comprising:

a base including a rail system;

a table removably positioned on the rail system and including a work piece support surface defining a support plane;

at least one roller attached to the table and configured such that when the table is positioned on the rail system, the at least one roller is movable in a direction parallel to and along a locking axis parallel to the support plane between a first position spaced apart from the rail system and a second position whereat the at least one roller is engaged with the rail system;

a transfer mechanism configured to force movement of the at least one roller between the first position and the second position in response to rotation of an actuator rod between a third position and a fourth position;

the actuator rod includes a helical slot;

the transfer mechanism comprises a tab stationarily and fixedly positioned with respect to the table and engaged with the helical slot;

a roller support base attached to the table;

a roller support plate slidingly positioned on the roller support base, the at least one roller including a rotational axis about which rotation of the at least one roller occurs wherein the at least one roller is rotationally attached to the roller support plate and the rotational axis is perpendicular to the locking axis;

an actuator rod follower, the actuator rod follower including a first portion operatively engaged with the actuator rod and a second portion operatively engaged with the roller support plate;

the actuator rod includes a bore extending axially from an end portion of the actuator rod; and the first portion of the actuator rod follower is positioned within the bore.

17. The saw system of claim 16, further comprising:

a pin operatively engaging the actuator rod and the first portion of the actuator rod follower.

* * * * *